United States Patent [19]

Abinett

[11] Patent Number: 4,648,746

[45] Date of Patent: Mar. 10, 1987

[54] PIPE LAYING AND REPLACEMENT

[75] Inventor: Raymond E. Abinett, Rochester, England

[73] Assignee: Water Research Centre, England

[21] Appl. No.: 756,981

[22] PCT Filed: Nov. 9, 1984

[86] PCT No.: PCT/GB84/00386

§ 371 Date: Aug. 28, 1985

§ 102(e) Date: Aug. 28, 1985

[87] PCT Pub. No.: WO85/02215

PCT Pub. Date: May 23, 1985

[30] Foreign Application Priority Data

Nov. 10, 1983 [GB] United Kingdom ............... 8330039

[51] Int. Cl.$^4$ ............................................. F16L 1/00
[52] U.S. Cl. ................................... 405/184; 405/154;
175/19; 138/97; 173/91
[58] Field of Search ............... 405/154, 178, 184, 156;
175/19, 62, 22, 23, 53; 138/91, 114; 254/29 R;
173/91

[56] References Cited

U.S. PATENT DOCUMENTS

| | | | |
|---|---|---|---|
| 3,995,702 | 12/1976 | Klimashko et al. | 173/91 |
| 4,132,277 | 1/1979 | Tupitsyn et al. | 175/19 |
| 4,284,147 | 8/1981 | Jenne | 175/19 X |
| 4,377,984 | 3/1983 | Donnelly | 118/105 |
| 4,505,302 | 3/1985 | Streatfield et al. | 405/184 X |
| 4,507,019 | 3/1985 | Thompson | 405/184 X |
| 4,537,265 | 8/1985 | Cox et al. | 175/19 |

FOREIGN PATENT DOCUMENTS

| | | |
|---|---|---|
| 86567 | 8/1983 | European Pat. Off. . |
| 2408978 | 8/1975 | Fed. Rep. of Germany . |
| 2113795 | 8/1983 | United Kingdom . |
| 2123111 | 1/1984 | United Kingdom . |

Primary Examiner—Dennis L. Taylor
Assistant Examiner—Nancy J. Stodola
Attorney, Agent, or Firm—Wegner & Bretschneider

[57] ABSTRACT

Apparatus for use in the laying and/or replacement of pipes under ground comprises a casing (1), a frusto-conical impact member (2) secured to one end of the casing and adapted to form an underground passage for the casing when the apparatus is being driven through the ground, a piston (7) reciprocally mounted in the casing and arranged to be driven by a source of compressed air or other fluid to engage the impact member (2) with a series of impacts to drive said member and the casing through the ground and a control valve member (11) adapted to be connected to a source of compressed air or other fluid and arranged to reciprocate the piston in the casing by means of said compressed air or other fluid. A pipe fitting (31) is connected to a tubular spacer member (23) which is mounted on the other end of the casing (1), said pipe fitting being adapted to be clamped to the leading end of a pipeline (29 and/or 30) which is to be laid in the underground passage formed by the impact member (2). The connection between the pipe fitting (31) and spacer member (23) includes a flanged sleeve (25) which permits relative rotation between the pipe fitting and the casing.

18 Claims, 2 Drawing Figures

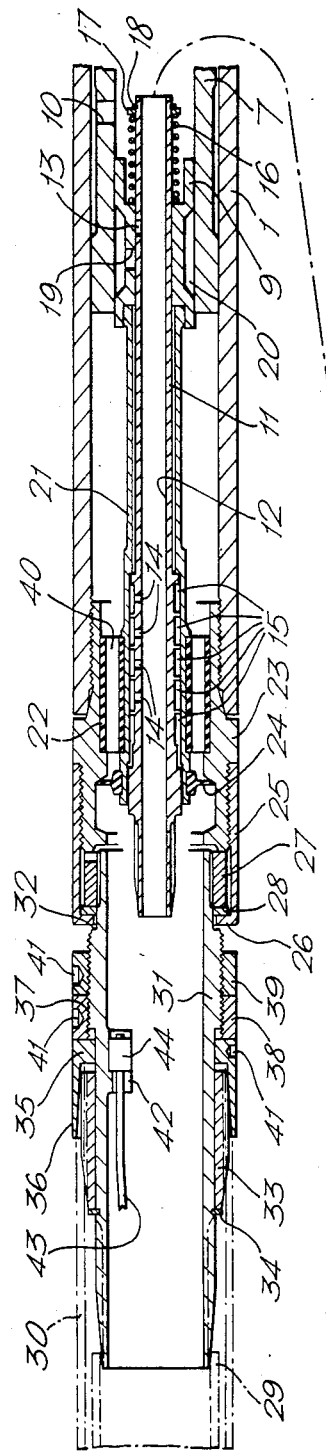
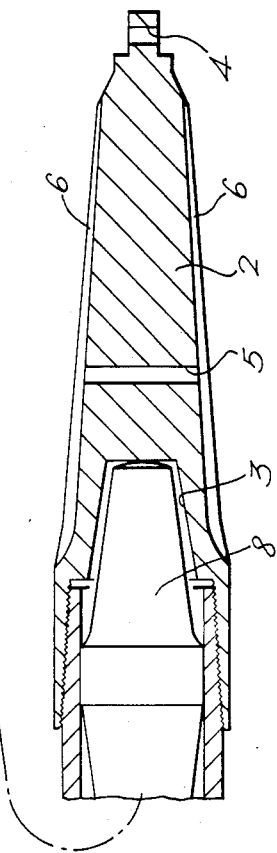
FIG.1.
FIG.2.

PIPE LAYING AND REPLACEMENT

This invention relates to apparatus for use in the laying and replacement of pipes underground.

It is known, for example, from British Patent Specification No. 2113795 to replace existing underground pipework by driving an expander into an existing pipeline with sufficient force to deform the pipe outwardly so that it is compressed into the surrounding ground and by feeding a new pipe into the space formerly occupied by the existing pipeline.

An entirely new pipeline can be installed by the same method except that in this case the expander compresses the soil to form a passage therein for the pipe which is to be inserted.

In either case, the expander should be driven with sufficient force to ensure that the existing pipe or soil can be deformed radially outwardly and compressed into the surrounding material which may be concrete or soil.

A known apparatus for performing the above-described method of pipe replacement comprises a conical or frusto-conical member adapted to engage the end of an existing pipe with its smaller end having a smaller diameter than the internal diameter of the pipe and its larger end having a diameter which is at least as great as the external diameter of the pipe, a jacket secured to the larger end of the conical or frusto-conical member and means for driving the said member into the pipe to cause the latter to be forced radially outwards and compressed into the surrounding ground by the forward movement of the conical or frusto-conical member and jacket.

The other end of the jacket was provided with a locking ring which was screwed into the jacket, or to an interconnecting spacer member, an the leading end of a replacement pipe was secured to the locking ring by means of co-operating screw-threads.

The drive means took the form of a pneumatic percussive device referred to in the art as an impact mole. Now it has been found that such devices tend to rotate in operation, the direction of rotation in the northern hemisphere being clockwise. As a result of this rotation, conventional right-hand screw-threads tend to become loosened when the apparatus is in operation so that the replacement pipe can work loose and even become detached from the apparatus. This problem could be overcome by using left-hand screw-threads but in that case the screw connection would be tightened and it could prove difficult to remove the apparatus from the pipe at the end of the pipe laying operation. Moreover, the rotation of the apparatus in the ground is conveyed to the following pipeline so that the sections of pipe also tend to rotate causing drag and impeding the progress of the apparatus through the ground which is a considerable disadvantage. In severe cases, twisting of the pipe can occur and this should be avoided if at all possible.

The present invention aims to provide an apparatus for use in the laying and replacement of underground pipes which overcomes the above-mentioned disadvantage.

According to the invention, there is provided an apparatus for use in the laying and/or replacement of pipes underground which comprises a cylindrical casing, a conical or frusto-conical member secured to one end of the casing and adapted to form an underground passage for the casing when the apparatus is being driven through the ground, a piston reciprocally mounted in the casing and arranged to be driven by a source of compressed air or other fluid to engage said conical or frusto-conical member with a series of impacts to drive said member through the ground, means for connecting the interior of the casing to a source of compressed air or other fluid, valve means to ensure that the piston is reciprocated in the casing by said compressed air or other fluid, a pipe fitting for clamping the leading end of a pipeline which is to be laid in the underground passage formed by said conical or frusto-conical member and a connection between the pipe fitting and the said other end of the casing, said connection comprising a sleeve connected to the said other end of the casing and having an internal flange, the pipe fitting being a free sliding fit in the sleeve to permit relative rotation between the pipe fitting and the sleeve, and hence the casing, and said pipe fitting being retained in the sleeve by projection means which are engageable with said internal flange of the sleeve.

Preferably the sleeve is provided with a screw-thread by means of which it is secured to the said other end of the casing. The pipe fitting is desirably is also provided with a screw-thread and the said projection means desirably comprise a lock nut which is engageable with said screw-thread. A thrust washer may be provided which is arranged to be located on the pipe fitting and clamped between the flange on the sleeve and the lock nut. The said one end of the pipe fitting is inserted into the sleeve through the flanged end thereof and is provided with the screw-thread with which the lock nut is engaged. The thrust washer is located on the pipe fitting before the lock nut is screwed on and is thus located between the lock nut and the flange of the sleeve. The pipe fitting is a free sliding fit in the sleeve so that relative rotation between the pipe fitting and sleeve is permitted. Thus, if the apparatus rotates in operation, this rotation is not conveyed to the pipe fitting and thus the pipeline is merely moved axially through the ground without rotating as it does so.

The invention will now be further described, by way of example, with reference to the drawings in which:

FIG. 1 is a section through one embodiment of an apparatus according to the invention; and FIG. 2 is a section through the rear end of a pipe which is being laid by the apparatus shown in FIG. 1, Reference will first be made to FIG. 1 of the drawings in which the apparatus comprises an elongate cylindrical casing 1 which is externally screw-threaded at one end and internally screw-threaded at its other end. A frusto-conical impact member 2 is screwed onto said one end of the casing 1, said member being substantially solid but having an internal cavity 3. The leading small end of the impact member 2 is provided with a bore 4 by means of which an impact probe (not shown) may be secured. A further bore 5 may also be provided in the impact member 2 for securing a larger impact probe (likewise not shown). A series of fins 6 may be provided on the impact member which serve to exert radial pressure on an existing pipe to aid in cracking the pipe which is to be replaced. The fins are desirably machined to have sharp edges in order to increase the point load pressures exerted on an existing pipe. The fins also, serve, to some extent, to reduce the tendency of the apparatus to rotate in operation.

Slidably mounted in the casing for reciprocation therein is a piston 7, the head 8 of the piston being receivable in the cavity 3 and the end of said piston being engageable with the bottom wall of the cavity. The rear portion of the piston 7 is hollow and a sleeve 9 is slidably mounted within this portion of the piston. The sleeve 9 is mounted on a control valve member 11, which extends into said piston at one end thereof, and is also mounted on a second sleeve 21. The rear end of the valve member 11 extends beyond the rear end of the casing 1 and is adapted to be connected by a pressure line (not shown) to a source of compressed air or other fluid such as a compressor (likewise not shown). The control valve member 11 has an axial longitudinal bore 12 extending throughout its length.

The control valve member 11 is slidable with respect to the sleeve 9 and is held in position in the sleeve by means of a coil spring 16 bearing at one end against the sleeve 9 and at the other end against a thrust washer 17 mounted on the valve member 11 and secured in position by a circlip 18. A radial bore 13 is provided in the wall of the valve member 11 and is normally held out of register with a bore 19 in the sleeve 9 by the spring 16. However, the bores 13 and 19 can be aligned with one another if the spring is compressed.

The second sleeve 21 is mounted at one end in the sleeve 9 and is mounted at its other end in an elastic bearing 22 which in turn is mounted in a tubular spacer member 23 secured to the rear end of the casing 1. A seal 24 is provided on the second sleeve 21 which seal bears against the spacer member 23 to prevent the ingress of dirt and moisture into the interior of the casing 1 while, at the same time, allowing compressed air or other fluid to escape.

In the region of the bearing 22, the second sleeve 21 is provided with an enlarged internal diameter to receive an enlarged diameter portion of the control valve member 11. The end of this enlarged portion is normally forced by the spring 16 against the shoulder formed in the second sleeve 21. This enlarged portion of the control valve member 11 is provided on its outer surface with a series of cavities 15 which retain rubber bushes. Air pressure is directed underneath these bushes via a series of radial bores 14 which are in communication with the axial bore 12.

In operation of the apparatus compressed air is directed along the axial bore 12 into the hollow chamber in the rear of the piston 7. The air then passes into the chamber 3 via a series of holes 10 in the wall of the piston. Owing to the difference in area between the interior and exterior of the piston 7, the piston is moved backwards, i.e. to the left as viewed in FIG. 1. When the holes 10 pass over the sleeve 9, the supply of air of the chamber 3 is terminated and when the holes 10 are moved back behind the sleeve 9, the compressed air in the chamber 3 is exhausted to atmosphere through exhaust bores 40 in the elastic bearing 22. The piston 7 is therefore driven forwards by the pressure of air in its hollow chamber until it strikes the impact member 2 to drive the machine forwards. The sequence is then repeated.

Reversability can be achieved by changing the axial position of the control valve member 11 so that air enters the chamber 3 via bores 13 and 19 and a chamber 20 formed in the sleeve 9 and the piston 7 slows before it reaches the impact member 2. The piston 7 is driven in the reverse direction until it strikes the spacer member 23 and drives the machine in the reverse direction. Reversal of the machine is, however, only required if the machine is caught up in some adverse condition and is not needed under normal conditions of operation.

The spacer member 23 is provided at one end with an external screw-thread which is engageable with the internal screw-thread on the other end of the casing 1 and at its other end with a second external screw-thread with which a nut 25 is engageable. Intermediate its ends, the member 23 has a collar having substantially the same external diameter as the external diameter of the casing 1. The nut 25 extends beyond the spacer member 23 to the rear of the apparatus and is provided, at its end remote from the spacer member, with an internal flange 26. One end of a pipe fitting 31 is inserted into the nut 25 through said flanged end and is held therein by means of a nut 27 which engages a screw-thread on said one end of the pipe fitting. A thrust washer 28 is also located on the pipe fitting so that it is interposed between the nut 27 and the flange 26.

The pipe fitting 31 takes the form of a hollow sleeve having a shoulder 32 which is engageable with the side of the flange 26 remote from the thrust washer 28. The other end of the pipe fitting is tapered to permit an end of a pipe 29 to be pushed thereon. As can be seen from the drawing, a tapered sleeve 33 is fitted on the pipe fitting 31 and is secured thereon by a circlip 34. The sleeve 33 is adapted to receive an end of a pipe 30 having a larger diameter than the pipe 29. Thus the pipe fitting can be used to lay pipes of two different diameters and can also be used to lay two co-axial pipes simultaneously.

A collar 35 having a depending skirt 36 is fitted on the pipe fitting so that the skirt surrounds part of the length of the sleeve 33 whereby the end of a pipe 30 can be gripped between the sleeve and the skirt.

Between its ends, the pipe fitting is provided with an external screw-threaded portion 37 with which a pair of nuts 38 and 39 are engageable. The first nut 38 is arranged to engage the collar 35 so as to force the skirt 36 thereof over the end of pipe 30 so that the pipe end is effectively clamped between said skirt and the sleeve 33. The second nut 39 serves as a lock nut. Radial bores 41 are provided in the collar 35 and nuts 38 and 39 to permit the engagement of tools for tightening the collar and nuts on the pipe fitting.

Within its internal bore, the pipe fitting 31 is further provided with a lug 42 having a through-going bore for receiving a cable 43. A ferrule 44 is provided on the end of the cable to prevent said cable from being pulled through the lug. The cable is arranged to extend through the pipe 29 or 30 to the other end thereof where, as shown in FIG. 2, it extends through a bore in a locking plate 45. This end of the cable 41 is provided with a screw-threaded ferrule 46 which is engaged by a lock nut 47. The nut 47 is tightened to draw the locking plate 45 against the end of the pipe and then to tension the cable 43. This arrangement ensures that the pipe will follow the driving apparatus as the latter advances through the ground.

When the apparatus is required for use, the nuts 38 and 39 are loosened to permit the collar 35 to be moved towards the nut 25 until said collar abuts a shoulder on the pipe fitting 31. Assuming two coaxial pipes are to be laid as shown in FIG. 1 of the drawings, the cable 43 is passed through the inner pipe 29, the end ferrule 46 at this stage being detached from the locking plate 45 and lock nut 47. The inner end of the pipe 29 is then forced over the tapered end of the pipe fitting 31. The outer pipe 30 is then fitted over the inner pipe 29 and its leading end is forced over the sleeve 33. The collar 35 is then pushed towards the pipe end so that the skirt engages said pipe end to hold the pipe firmly on the sleeve 33. The nut 38 is then tightened to hold the collar 35 firmly in position and then the lock nut 39 is also tightened. Finally, the locking plate 45 is fitted onto the ferrule 46 to hold the pipes in position and the lock nut 47 is screwed onto the ferrule 46 to tension the cable 43. Although FIG. 2 shows only the pipe 29, it will be appreciated that the same arrangement can be used in conjunction with the pipe 30. In that case, the outer diameter of the locking plate will be substantially the same as the outer diameter of the pipe 30 and, if an inner pipe 29 is also being laid, the locking plate will also bear against the end of this pipe.

Further sections of pipe can be laid simply by removing the locking plate 45, securing a further end of cable to the ferrule 46 and passing this cable through the next pipe section which is to be laid. The succeeding sections of pipe 29 or 30 are secured to the preceding sections by conventional means such as co-operating screw-threads and the locking plate 45 re-fitted at the trailing end of the pipe sections 29 and/or 30.

Preferably, the sleeve 33 is provided with an external screw-thread for co-operation with an internal screw-thread on a pipe length 30. The rear end of the pipe fitting 31 may also be provided with an external screw-thread for co-operation with an internal screw-thread of a pipe length 29.

It will be seen that, by means of the pipe fitting according to the invention, pipes can be laid by means of ground burrowing apparatus without the apparatus, which rotates in use, causing rotation of the following pipe.

The invention is not restricted to the above-described embodiment but variations and modifications may be made without departing from the scope of this invention.

I claim:

1. Apparatus for use in the laying and/or replacement of pipes underground which comprises a cylindrical casing, a conical or frusto-conical member secured to one end of the casing and adapted to form an underground passage for the casing when the apparatus is being driven through the ground, a piston reciprocally mounted in the casing and arranged to be driven by a source of compressed air or other fluid to engage said conical or frusto-conical member with a series of impacts to drive said member through the ground, means for connecting the interior of the casing to a source of compressed air or other fluid, valve means to ensure that the piston is reciprocated in the casing by said compressed air or other fluid, a pipe fitting for clamping to the leading end of a pipeline which is to be laid in the underground passage formed by said conical or frusto-conical member and a connection between the pipe fitting and the said other end of the casing, said connection comprising a sleeve connected to the said other end of the casing and having an internal flange, the pipe fitting being a free sliding fit in the sleeve to permit relative rotation between the pipe fitting and the sleeve, and hence the casing, and said pipe fitting being retained in the sleeve by projection means which are engageable with said internal flange of the sleeve.

2. Apparatus according to claim 1, wherein the sleeve is provided with a screw-thread by means of which it is secured to the said other end of the casing.

3. Apparatus according to claim 1, wherein the pipe fitting is provided with a screw-thread and said projection means comprise a lock nut which is engageable with said screw-thread.

4. Apparatus according to claim 3, wherein a thrust washer is provided, said thrust washer being located on the pipe fitting and arranged to be clamped between the flange on the sleeve and the lock nut.

5. Apparatus according to claim 1, wherein the conical or frusto-conical member is provided with a series of radially extending fins to aid in fracturing an existing pipe and to reduce the tendency of the apparatus to rotate in operation.

6. Apparatus according to claim 1, wherein the said one end of the casing is provided with a cavity adapted to receive one end of the piston, the other end of the piston being hollow and a first sleeve being slidably mounted in the said other end of the piston, a control valve member being mounted in said first sleeve and extending at one end into the said other end of the piston and the other end of the control valve member being adapted to be connected by a pressure line to said source of compressed air or other fluid, the control valve member further having an axial bore extending throughout its length.

7. Apparatus according to claim 6, wherein the control valve member is slidable with respect to the first sleeve and is held in position by a coil spring bearing at one end on the sleeve and at the other end on a thrust washer mounted on the control valve member.

8. Apparatus according to claim 7, wherein the first sleeve and the control valve member are provided with radial bores which are normally held out of alignment by the coil spring.

9. Apparatus according to claim 6, wherein the first sleeve is mounted on one end of a second sleeve through which the control valve member extends.

10. Apparatus according to claim 9, wherein the other end of said second sleeve is mounted in an elastic bearing which is mounted in a tubular spacer member secured to said other end of the casing.

11. Apparatus according to claim 10, wherein a seal is provided on said second sleeve, said seal being arranged to bear against the tubular spacer member to prevent the ingress of dirt and moisture into the interior of the casing while allowing compressed air or other fluid to escape from said casing.

12. Apparatus according to claim 10 wherein the said connection between the pipe fitting and the said other end of the casing includes said tubular spacer member which is provided with an external screw-thread at each end, one screw-thread being engageable with a corresponding internal screw-thread on the casing.

13. Apparatus according to claim 1, wherein the pipe fitting takes the form of a hollow sleeve having a tapered end which is adapted to be pushed into the end of a pipeline.

14. Apparatus according to claim 13, wherein a tapered sleeve is mounted coaxially on said hollow sleeve and is adapted to receive the end of a second pipeline having a larger diameter than that of the first-mentioned pipeline whereby two coaxial pipelines can be laid simultaneously.

15. Apparatus according to claim 14, wherein a collar having a depending skirt is provided on the pipe fitting, said skirt surrounding part of the length of the tapered sleeve whereby the end of said second pipeline can be gripped between the skirt and the said tapered sleeve.

16. Apparatus according to claim 13, wherein the pipe fitting is provided with an internal lug having a through-going bore for receiving a cable.

17. Apparatus according to claim 16, wherein one end of the cable is prevented from pulling through the bore in said lug, said cable being arranged to extend through a pipeline fitted to the pipe fitting and extending through a locking plate at the other end of said pipeline, means being provided for tensioning the cable against the locking plate.

18. Apparatus according to claim 17, wherein the cable tensioning means comprises a screw-threaded ferrule provided on the other end of the cable and engageable by a lock nut.

* * * * *